US006610974B1

(12) United States Patent
Hunt et al.

(10) Patent No.: US 6,610,974 B1
(45) Date of Patent: Aug. 26, 2003

(54) POSITIONING A MOVABLE REFLECTOR IN AN OPTICAL SWITCH

(75) Inventors: Peter Hunt, Scotts Valley, CA (US); Kevin White, Los Gatos, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 09/586,711

(22) Filed: Jun. 5, 2000

(51) Int. Cl.[7] .................................................. G01J 1/36
(52) U.S. Cl. ................ 250/227.22; 385/18; 250/227.14
(58) Field of Search ....................... 250/214 SW, 252.1, 250/227.22, 227.14, 227.21; 385/18, 16, 17, 52; 359/223

(56) References Cited

U.S. PATENT DOCUMENTS

| 2,982,859 A | 5/1961 | Steinbrechner |
| 3,492,484 A | 1/1970 | Iti |
| 4,274,712 A | 6/1981 | Sintes |
| 4,365,863 A | 12/1982 | Broussaud |
| 4,421,381 A | 12/1983 | Ueda et al. |

(List continued on next page.)

FOREIGN PATENT DOCUMENTS

| DE | 19757181 A1 | 7/1999 |
| EP | 0 834759 A2 | 4/1998 |
| EP | 0 980014 A1 | 2/2000 |
| EP | 120989 A1 | 8/2001 |
| EP | 1 120677 A2 | 8/2001 |
| GB | 2 175 705 A | 12/1986 |
| GB | 2 239 101 A | 6/1991 |
| JP | 60-107017 | 6/1985 |
| JP | 5-107485 A | 4/1993 |

(List continued on next page.)

OTHER PUBLICATIONS

Janusz Bryzek, Kurt Petersen & Wendell McCulley, "Micromachines on the March," IEEE Spectrum, pp. 20–31 (May 1994).

"Lucent's New All–Optical Router Uses Bell Labs Microscopic Mirrors," Bell Labs press release, pp. 1–4, Nov. 10, 1999. http://www.bell–labs.com/news/1999/november/10/1.html.

M. Adrian Michalicek, Wenge Zhang, Kevin F. Harsh, Victor M. Bright, and Y.C. Lee, "Micromirror Arrays Fabricated by Flip–Chip Assembly," Part of the SPIE Conference on Miniaturizes Systems with Micro–Optics and MEMs, Santa Clara, SPIE vol. 3878, pp. 68–79 (Sep. 1999).

Ming C. Wu, "MEMS for Optical and RF Applications." UCLA Extension, Department of Engineering, Information Systems and Technical Management, Engineering: 823.52, Nov. 1–3, 1999.

M.C. Wu, L.–Y Lin, S.–S. Lee, and K.S.J. Pister, "Micromachined Free–Space Integrated Micro–Optics," Sensors and Actuators A, 50, pp. 127–134 (1995).

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum,, L. Zhang, and C.R. Giles, "Fully Provisional 112×112 Micro–Mechanical Optical Crossconnect With 35.8Tb/s Demonstrated Capacity," OFC 2000 Tech. Dig., Baltimore, Maryland, pp. 202–204 (Mar. 7–10, 2000).

Primary Examiner—Robert H. Kim
Assistant Examiner—Chih-Cheng Glen Kao
(74) Attorney, Agent, or Firm—Blakely, Sokoloff, Taylor & Zafman LLP

(57) ABSTRACT

A method for positioning a movable reflector in an optical switch. A set of optical power values are generated by measuring optical power related to optical reflections from the movable reflection for a plurality of positions of the movable reflector. A processor is used to generate a mathematical approximation of a relationship of optical power versus reflector position based on the set of optical power values. A position of the movable reflector is chosen based on a point in the mathematical approximation of the relationship of optical power versus reflector position.

11 Claims, 12 Drawing Sheets

U.S. PATENT DOCUMENTS

| | | | |
|---|---|---|---|
| 4,574,191 A | 3/1986 | Conrad | |
| 4,614,868 A | 9/1986 | Alster | |
| 4,677,290 A | 6/1987 | Mitch | |
| 4,696,062 A | 9/1987 | LaBudde | |
| 4,746,195 A | 5/1988 | Auracher et al. | |
| 4,758,061 A | 7/1988 | Horn | |
| 4,823,402 A | 4/1989 | Brooks | |
| 4,838,631 A | 6/1989 | Chande et al. | |
| 4,838,637 A | 6/1989 | Torok et al. | |
| 4,859,012 A | 8/1989 | Cohn | |
| 4,981,335 A | 1/1991 | Gaebe | |
| 5,077,622 A | 12/1991 | Lynch | |
| 5,077,815 A | 12/1991 | Yoshizawa et al. | |
| 5,097,354 A | 3/1992 | Goto | |
| 5,172,262 A | 12/1992 | Hornbeck | |
| 5,177,348 A | 1/1993 | Laor | |
| 5,383,118 A | 1/1995 | Nguyen | |
| 5,440,654 A | 8/1995 | Lambert, Jr. | |
| 5,471,332 A | 11/1995 | Shiragaki et al. | |
| 5,524,153 A | 6/1996 | Laor | |
| 5,546,484 A | 8/1996 | Fling et al. | |
| 5,600,739 A * | 2/1997 | Anderson et al. | 385/16 |
| 5,623,337 A * | 4/1997 | Iori et al. | 356/153 |
| 5,627,669 A | 5/1997 | Orino et al. | |
| 5,629,790 A | 5/1997 | Neukermans et al. | |
| 5,648,618 A | 7/1997 | Neukermans et al. | |
| 5,671,304 A | 9/1997 | Duguay | |
| 5,673,139 A | 9/1997 | Johnson | |
| 5,907,425 A | 5/1999 | Dickensheets et al. | |
| 5,914,207 A | 6/1999 | Nishiki et al. | |
| 5,920,417 A | 7/1999 | Johnson | |
| 5,960,132 A | 9/1999 | Lin | |
| 6,002,818 A | 12/1999 | Fatchi et al. | |
| 6,049,412 A | 4/2000 | Bergmann et al. | |
| 6,075,639 A | 6/2000 | Kino et al. | |
| 6,097,858 A | 8/2000 | Laor | |
| 6,097,859 A | 8/2000 | Solgaard et al. | |
| 6,097,860 A | 8/2000 | Laor | |
| 6,101,299 A | 8/2000 | Laor | |
| 6,201,622 B1 | 3/2001 | Lobbett et al. | |
| 6,208,469 B1 | 3/2001 | Matsuura | |
| 6,208,784 B1 | 3/2001 | Glen et al. | |
| 6,222,679 B1 | 4/2001 | Nevis | |
| 6,236,481 B1 | 5/2001 | Laor | |
| 6,245,590 B1 | 6/2001 | Wine et al. | |
| 6,249,626 B1 | 6/2001 | Bergmann | |
| 6,253,001 B1 * | 6/2001 | Hoen | |
| 6,253,010 B1 * | 6/2001 | Belser et al. | |
| 6,256,430 B1 | 7/2001 | Jin et al. | |
| 6,262,827 B1 | 7/2001 | Ueda et al. | |
| 6,289,145 B1 | 9/2001 | Solgaard et al. | |
| 6,295,154 B1 | 9/2001 | Laor et al. | |
| 6,320,998 B1 | 11/2001 | Okayama et al. | |
| 6,330,102 B1 | 12/2001 | Daneman et al. | |

FOREIGN PATENT DOCUMENTS

| | | |
|---|---|---|
| JP | 6-180428 | 6/1994 |
| WO | WO 99/67666 | 12/1999 |
| WO | WO 01/33898 A2 | 5/2001 |
| WO | WO 01/39413 A2 | 5/2001 |
| WO | WO 01/95009 A2 | 12/2001 |
| WO | WO 01/95010 A2 | 12/2001 |
| WO | WO 01/95011 A2 | 12/2001 |
| WO | WO 01/95013 A2 | 12/2001 |

* cited by examiner-

POSITIONING A MOVABLE REFLECTOR IN AN OPTICAL SWITCH

FIELD OF THE INVENTION

The present invention pertains to the field of optical switching. More particularly, the present invention relates to techniques for positioning optical reflectors into optimal positions.

BACKGROUND OF THE INVENTION

One type of prior art microelectromechanicalsystem ("MEMS") device is a gimbaled reflector or mirror, which is fabricated using integrated circuit ("IC") techniques. The gimbaled mirror is used to reflect light in X and Y axes. Gimbaled mirrors typically use electrostatic actuation to move the mirror. The electrostatic actuation is typically induced by pairs of parallel plate electrodes residing beneath the movable members of the gimbaled mirror device.

One problem with a typical prior art gimbaled MEMS mirror is determining the actual position of the mirror. One prior technique uses strain gauges on the gimbals to monitor the physical position of the mirror. One disadvantage of that technique is the need for extra wiring for the strain gauges. The strain gauges and concomitant wiring add complexity and expense and take up valuable space.

Another problem with a typical prior art gimbaled MEMS mirror device is the difficulty of accurately maintaining a particular mirror position or a particular path of reflected light over time. Different temperatures may cause different expansions and contractions of the materials making up the gimbaled mirror device. Gimbals may weaken over time and through use. Electronics, including amplifiers and strain gauges, may drift over time and also may be affected by temperature. The forces needed to maintain a position of the mirror of the gimbaled mirror device may thus change with temperature and time. The geometry of an assembly holding multiple gimbaled mirror devices may also change with temperature and time. A resulting problem from a drifting mirror position is that the path of light reflected by the gimbaled mirror will change. A small change in mirror position could lead to a large change in the position of an end of a beam of light.

SUMMARY OF THE INVENTION

A method for positioning a movable reflector in an optical switch is described. A set of optical power values are generated by measuring optical power related to optical reflections from the movable reflector for a plurality of positions of the movable reflector. A processor is used to generate a mathematical approximation of a relationship of optical power versus reflector position based on the set of optical power values. A position of the movable reflector is chosen based on a point in the mathematical approximation of the relationship of optical power versus reflector position.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Techniques are described for using direct optical signal feedback to maintain light paths and control mirror positions in an optical cross-connect switch.

As is described in more detail below, an optical cross-connect switch has two planes of mirrors, each plane containing an array of MEMS gimbaled reflectors (also referred to as MEMS gimbaled mirrors). The optical switch has a plurality of input optical fibers and a plurality of output optical fibers. The optical cross-connect switch allows light beams from any input fiber of the switch to be redirected to any output fiber of the switch. A path of light through the optical cross-connect switch is first reflected by a MEMS gimbaled mirror of the first plane of mirrors and then reflected by a MEMS gimbaled mirror of the second plane of mirrors.

Techniques are described below for maintaining the path of light through the optical switch despite the effects of temperature and time tending to move the positions of the gimbaled mirrors out of alignment. One technique involves making a number of relatively small changes in the position of a mirror of a gimbaled MEMS mirror device that resides in one mirror plane. The optical power from the output light from the optical cross-connect switch is detected (i.e., sampled) during the making of the numerous small changes in the position of the gimbaled mirror. A processor generates a mathematical approximation of a relationship of optical power versus gimbaled mirror position based on the detected optical power samples. One embodiment uses a Gaussian curve as the mathematical approximation used by the processor. For a Gaussian curve, the maximum point in the curve is then chosen as the optimal mirror position. The gimbaled mirror is then moved to that optimal position.

The above procedure is then repeated for a gimbaled mirror in the same light path but residing in the second mirror plane. That procedure thus results in the positioning of the gimbaled mirror in the second mirror plane to an optimal position.

Thus, the optical output power signal is used as a feedback signal by the processor to help to choose an optimal mirror position. The optimal mirror position thus helps to maintain an optimal light path through the optical cross-connect switch. Advantageously, this procedure can be used while the switch is carrying customer data over the light beams without interrupting the data transmission.

The following is a more detailed discussion of embodiments of the present invention.

Figure 1:
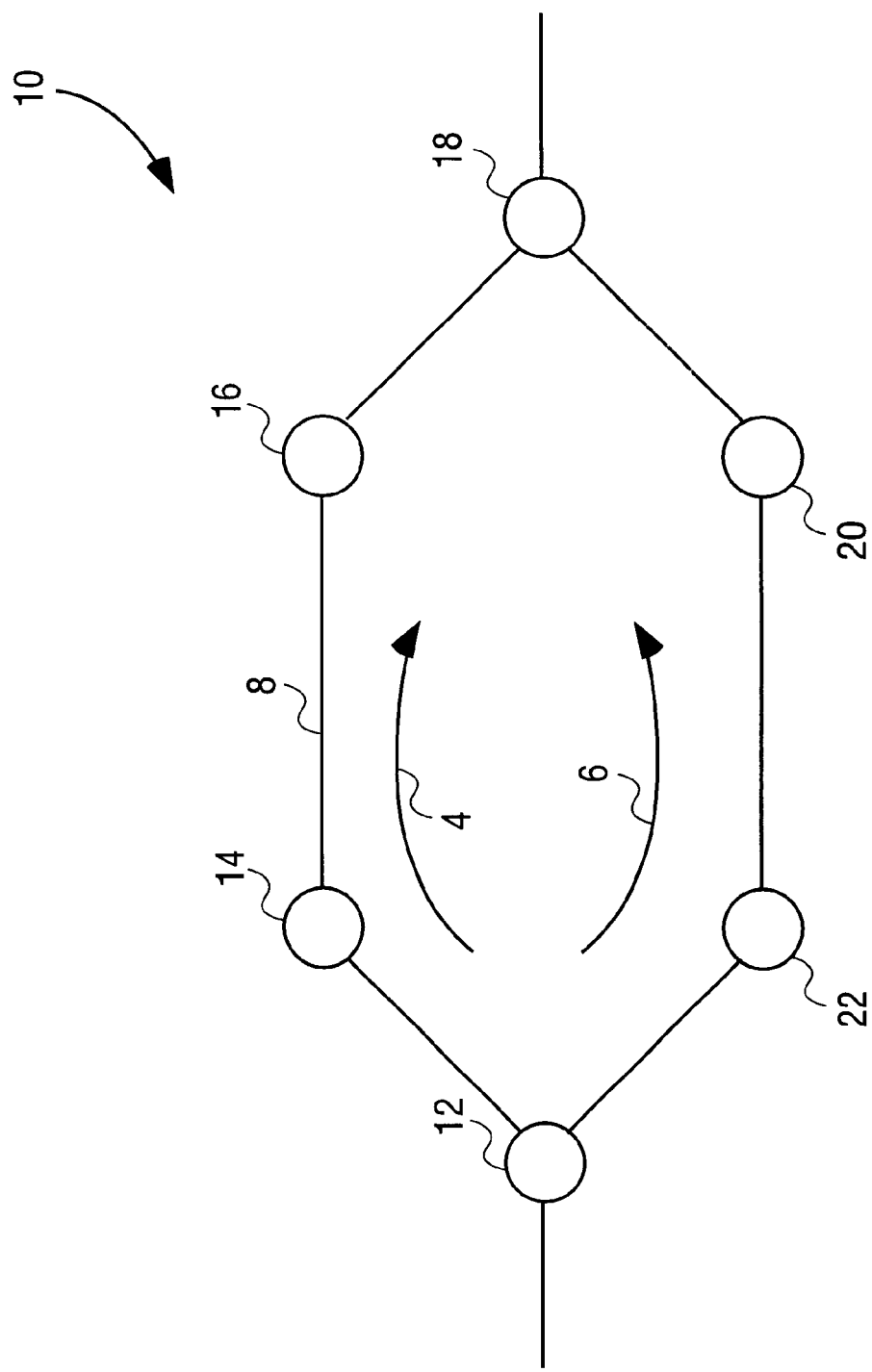
FIG. 1 shows an optical network with optical cross-connect switches.

FIG. 1 illustrates a fiber optic network 10 that employs optical cross-connect switches 12, 14, 16, 18, 20, and 22. The optical cross-connect switches 12, 14, 16, 18, 20, and 22 allow the optical network 10 to recover from failures relatively rapidly. For example, if the optical fiber line connecting switches 14 and 16 is accidently severed, the data carried by optical signals through path 4 will not be able to make it to switch 18. In the event of such a failure, optical cross-connect switch 12 would redirect the optical path from path 4 to path 6, thereby avoiding the cut in the fiber line 8.

The optical fiber network 10 can carry digital data, voice signals, and video signals over fiber optic lines at various transmission speeds. Fiber optic network 10 can send digital information in various formats—for example, an ATM format. Digital fiber optic network 10 can send Internet and Intranet traffic. Digital fiber optic network 10 can, for example, use dense wavelength division multiplexing ("DWDM") technology to transfer digital information at a very high capacity.

Figure 2:
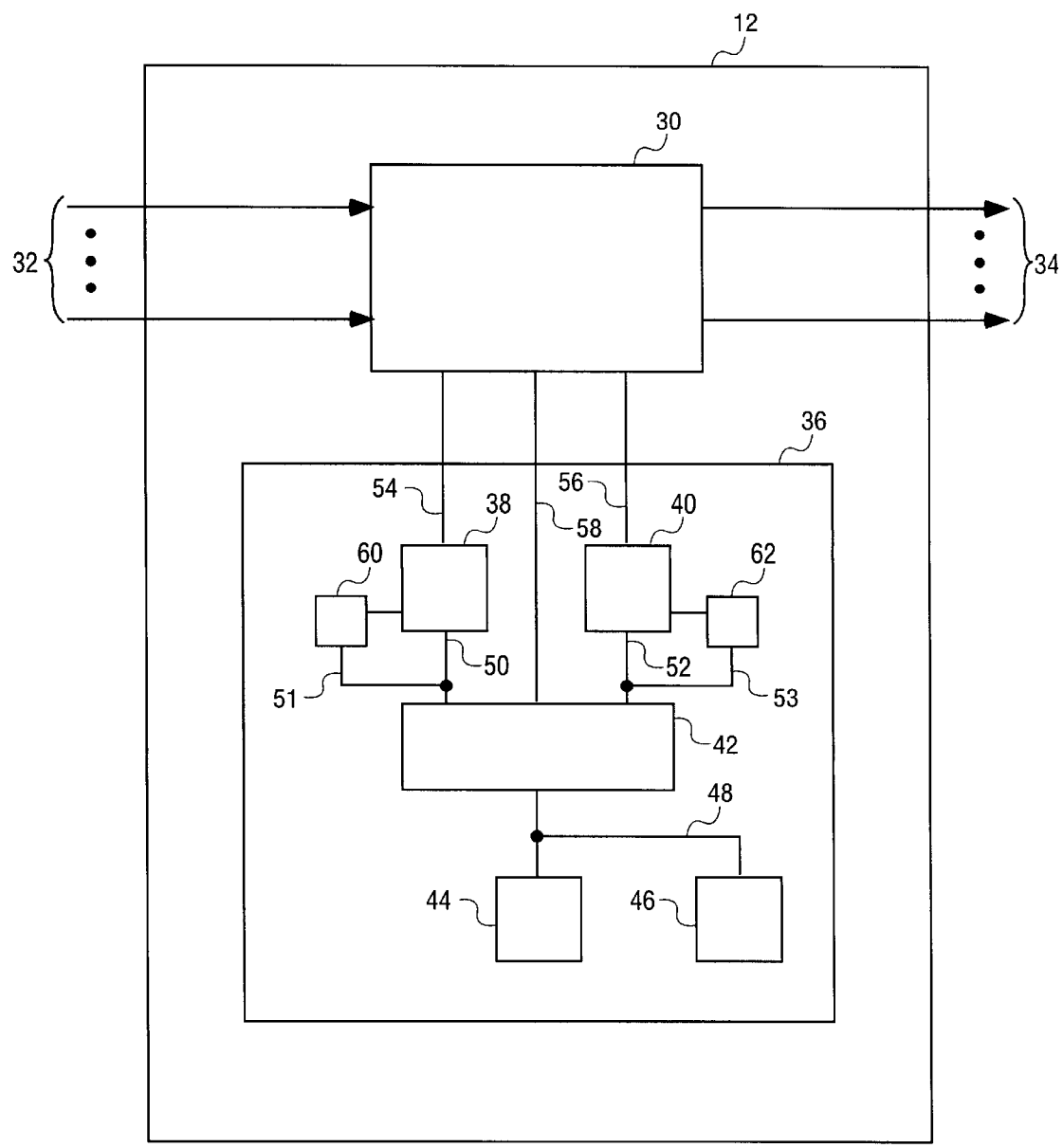
FIG. 2 is a block diagram of an optical cross-connect switch.

FIG. 2 is block diagram of optical cross-connect switch 12. Switch 12 includes fiber and mirror array assembly 30, which is coupled to control circuitry 36. Fiber and mirror array assembly 30 is shown in more detail in FIGS. 3, 4 and 5. Fiber and mirror array assembly 30 receives as inputs an array of fiber optic cables 32. An array 34 of fiber optic cables is provided as an output from fiber and mirror array assembly 30.

Control circuitry 36 includes digital signal processors ("DSPs") 38 and 40. DSP 38 is coupled to fiber and mirror array assembly 30 via lines 54. DSP 40 is coupled to fiber and array assembly 30 via lines 56. For one embodiment of the invention, DSPs 38 and 40 are each a TMS320C6211 digital signal processor supplied by Texas Instruments of Dallas, Tex. Memory 60 is coupled to DSP 38. Memory 62 is coupled to DSP 40.

DSP 38 controls the first array 84 of MEMS gimbaled mirrors. DSP 40 controls the second array 86 of MEMS gimbaled mirrors. DSP 38 controls the voltages and currents sent to position the mirrors within the first mirror array 84. DSP 40 controls the voltages and currents used to position the mirrors of the second mirror array 86 found within fiber and mirror array assembly 30. Each DSP 38 and 40 receives optical power values from optical detectors 122 and 124 (see FIG. 4) residing within fiber and mirror array assembly 30.

DSP 38 is able to generate a mathematical approximation of the relationship of optical power versus mirror (or reflector) position based on a set of optical power values received by DSP 38 for the first mirror array 84. DSP 38 is able to choose a position of the movable mirror or reflector of a mirror within the first mirror array 84 based on a point in the mathematical approximation of the relationship of optical power versus reflector position. DSP 38 is able to do this by running code stored within memory 60.

Likewise, DSP 40 can generate a mathematical approximation of a relationship of optical power versus mirror (or reflector) position based on a set of optical power values with respect to a mirror within the second mirror array 86. Likewise, DSP 40 can choose a position of a movable mirror or reflector within the second mirror array 86 based on a point in the mathematical approximation of the relationship of optical power versus reflector position. DSP 40 runs code stored within memory 62.

DSP 38 is able to run the mathematical approximation used to choose the optimal mirror position in parallel for all the mirrors within the first mirror array 84. Likewise, DSP 40 is able to generate the mathematical approximation for choosing the optimal mirror position in parallel for all the mirrors within the second mirror array 86.

Processor 42 is coupled to DSP 38 via lines 50 and to DSP 40 via lines 52. Processor 42 is coupled to memory 60 via lines 51. Memory 60 is a shared memory that is shared by DSP 38 and processor 42. Processor 42 is coupled to memory 62 via lines 53. Memory 62 is a shared memory that is shared by DSP 40 and processor 42.

Processor 42 is coupled to fiber and mirror array assembly 38 via lines 58. Processor 42 is also coupled to volatile memory 44 and non-volatile memory 46 via bus 48.

For one embodiment, processor 42 is an MPC860 PowerPC microprocessor supplied by Motorola, Inc. of Schaumburg, Illinois.

Processor 42 oversees the operations of DSP 38 and DSP 40. Processor 42 oversees the operation of maintaining the optimal signal path through fiber and mirror array assembly 30. Processor 42 runs code that ensures that the optimal mirror position is chosen in one mirror array for a particular light path before the optimal mirror position is chosen in the second mirror array in that same light path. In other words, processor 42 oversees the shifting of processing from DSP 38 to DSP 40 for a particular light path optimization procedure. As will be described in more detail below, one mirror in a light path is optimized before the second mirror in the light path is then optimized. Processor 42 allows the shifting of optimization from one mirror array to the other. The processing for the mirrors on a particular mirror array is done in parallel, however, so there is parallel global shifting between a first mirror array and a second mirror array that is coordinated by processor 42.

Figure 3:
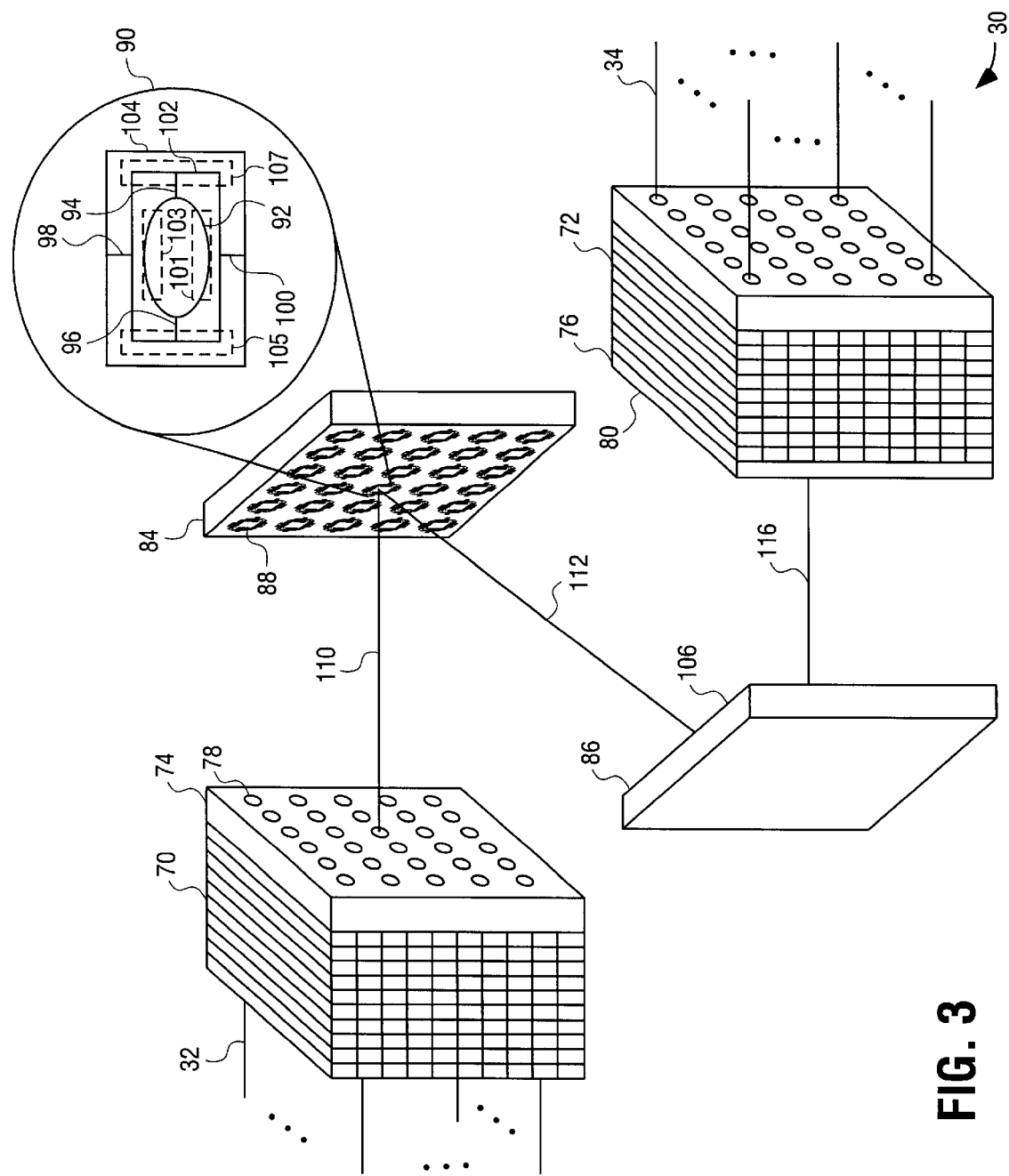
FIG. 3 illustrates the mirror planes, lens assemblies, and fiber blocks of the optical cross-connect switch.

FIG. 3 illustrates fiber and mirror array assembly 30. Fiber and mirror array assembly 30 includes input fibers 32, input fiber block 70, lens array 74, first mirror assembly 84, second mirror assembly 86, output fiber block 72, second lens array 76, and output fibers 34.

Input fiber block 70 includes a plurality of input optical fibers 32 for transmitting light to first lens array 74. First lens array 74 includes a plurality of optical lenses 78 that are used to direct collimated beams of coherent light from input fiber block 70 to individual MEMS mirror devices 88 on first mirror array 84. First MEMS mirror array 84 includes a plurality of electrically addressable MEMS mirror devices 88, such as for example, MEMS mirror device 90, which is shown in a blow-up view in FIG. 3.

MEMS gimbaled mirror device 90 is also referred to as MEMS gimbaled mirrored reflector 90. Gimbaled mirrored device 90 includes a reflector or mirror 92 that is connected to a frame 102 via gimbals 94 and 96. Frame 102 is in turn connected to an outer frame 104 via gimbals 98 and 100. Gimbals 94 and 96 reside in the same axis. Gimbals 98 and 100 reside in the same axis. The axis of gimbals 98 and 100 is perpendicular to the axis of gimbals 94 and 96.

Gimbals 94 and 96 allow mirror or reflector 92 to rotate in a Y direction. Gimbals 98 and 100 allow frame 102 holding reflector 92 to rotate in the X direction. Thus, the gimbaled arrangement of MEMS device 90 allows the mirror 92 to direct light in X or Y directions.

Electrostatic actuators 101 and 103 are plates that reside in parallel with each other. Electrostatic actuators 101 and 103 provide the force for rotating mirror 92 in a Y direction. Electrostatic actuators 105 and 107 are plates that reside in parallel with each other and perpendicular to electrostatic actuators 101 and 103. Electrostatic actuators 105 and 107 provide the force for rotating frame 102 (holding reflector 92) in an X direction.

For alternative embodiments, MEMS mirror device 90 may be of different shapes or configurations. For example, the mirror component 92 may be circular, oval, or rectangular.

MEMS mirror assembly 84 is also referred to as MEMS mirror array 84, first mirror plane 84, or first reflector plane 84. First mirror assembly 84 includes an array 88 of MEMs gimbaled mirrors. Each MEMS mirror of array 88 such as MEMS mirror 90 can reflect a light beam. Thus, the MEMS mirror array 84 has mirror components that can redirect or reflect a light beam to differing MEMS mirror devices on second MEMS mirror assembly 86.

Second MEMS mirror assembly 86 includes an array of gimbaled MEMS mirrors 106 that can redirect light beams to second lens array 76, which includes a series of lenses 80. Second lens array 80 accepts collimated light beams from the second MEMS mirror assembly 86 and focuses the light beams to individual fibers 34 of fiber block assembly 72.

For one embodiment of the invention, the mirror array 84 contains 256 mirrors. Accordingly, there would be 256 fibers making up fibers 32, and 256 mirrors 106 making up second mirror array 86, along with 256 fibers 34. There would also be 256 lenses 78 and 256 lenses 80. For an alternative embodiment, mirror assembly 84 contains 1,024 mirrors. There would accordingly be 1,024 respective fibers 32, fibers 34, lenses 78, mirrors 106. and lenses 80. For alternative embodiments, there could be any number of mirrors in mirror arrays 84 and 86. There could also be any number of fibers 32, fibers 34, and lenses 78, and lens 80.

Fiber and lens assembly 30 thus allows light beams from any input fiber 32 of input fiber block 70 to be redirected to any output fiber 34 of output fiber block 72. For example, a light beam 110 received from one of the input fibers 32, fiber block 70, and one of the lenses 78 is reflected by and redirected by mirror 90 of mirror assembly 84. The light beam 110 is reflected as light beam 112, which is transported from first mirror assembly 84 to second mirror assembly 86. Light beam 112 is reflected by and redirected by one of the MEMS mirrors 106 of second mirror assembly 86. The redirected light beam 112 becomes light beam 116 that travels between one of the MEMS 106 and is received by one of the lenses 80 of output lens array 76. The light beam 116 in turn is focused by one of the lenses 80 and sent through fiber block 72 onto one of the output fiber optic lines 34. A light beam thus follows a path comprised of beams 110, 112, and 116 through the fiber and mirror and assembly 30.

The position of a mirror or reflector (such as gimbaled mirror 90) is defined by the spot the mirror (or reflector) will direct light to (or receives the right from) in the opposite mirror plane—i.e., the target mirror plane Cartesian coordinates. The mirrors 88 and 106 are moved or dithered by applying voltages to the electrostatic actuators of the mirrors, such as electrostatic actuators 101, 103, 105, and 107 of gimbaled mirror 90.

Referring to FIG. 2, DSPs 38 and 40 use a mirror position table to translate Cartesian coordinates into the voltages for the electrostatic actuators for rotation of the mirrors in the respective mirror arrays 84 and 86. The DSPs 38 and 40 address the mirror position table by the integer values of the target mirror Cartesian coordinates and the mirror position table provides the voltages that are needed to point to the particular target mirror.

As will be described in more detail below, optical feedback power signals are monitored in order to move a mirror to an optimal mirror position.

Although the embodiment shown in FIG. 3 has two planes of mirrors (i.e., planes 84 and 86), alternative embodiments may have any other number of mirror planes for reflecting light beams—for example, one mirror plane, three mirror planes, four mirror planes, etc.

Thus, light is reflected from mirror plane 84 to mirror plane 86. There is at least one mirror of mirrors 88 per lens of lenses 78. Each mirror of mirrors 88 can be controlled to rotate in two dimensions, allowing the mirror to direct the reflected light to any position on the second dimensional array 86 of mirrors.

The second mirror plane 86 includes gimbaled mirrors 106. Gimbaled mirrors 106 receive the light reflected from first mirror plane 84 and send reflected light to the set of output lenses 80. There is at least one mirror of mirror array 106 for each lens of output lens array 80. Each mirror of mirror array 106 directs light to its own dedicated lens of output lens array 80.

Figure 4:
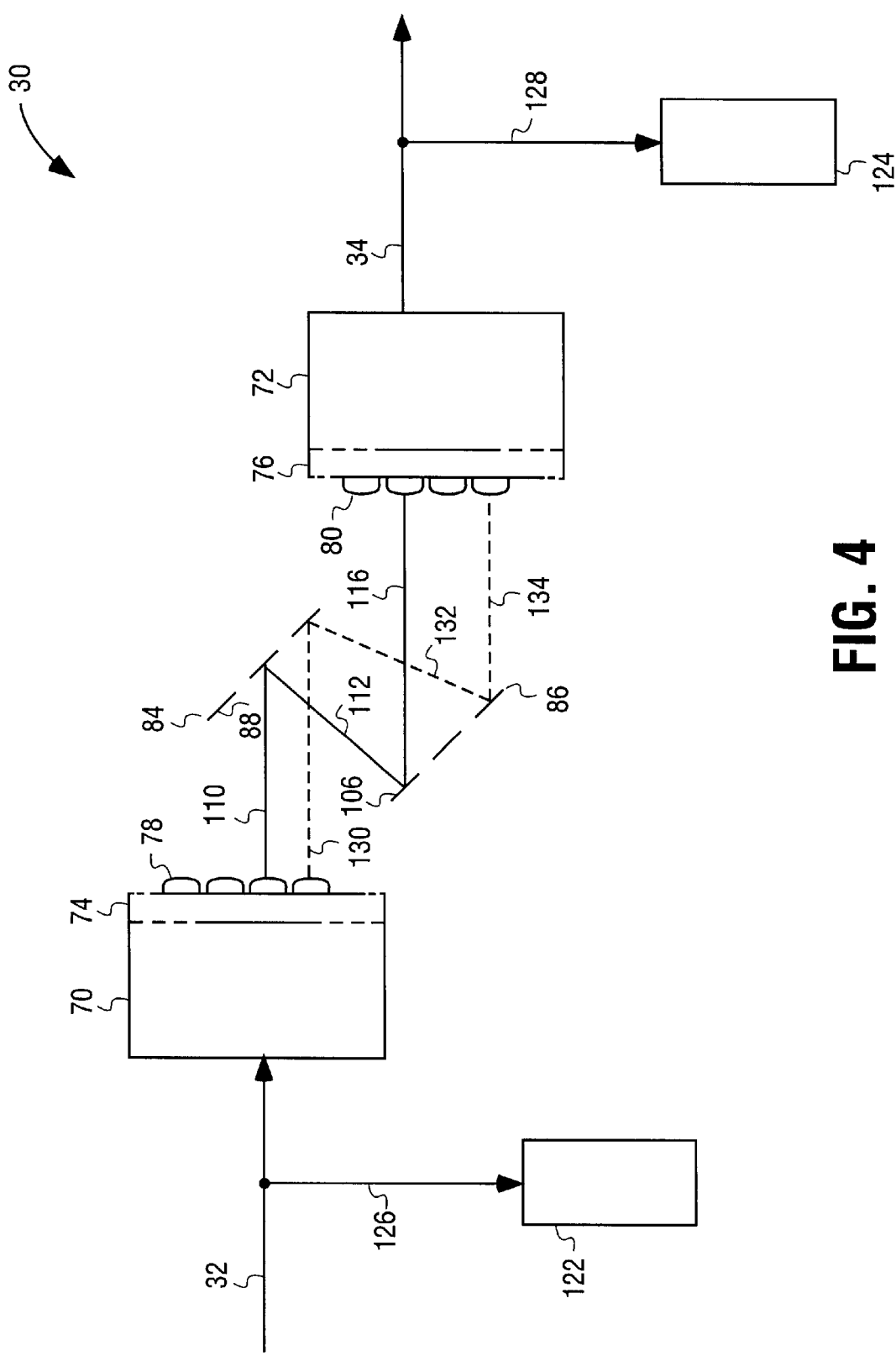
FIG. 4 is a top view of optical power detectors, the fiber blocks, the lens assemblies, and the mirror planes of the optical cross-connect switch.

FIG. 4 is a top view of fiber and mirror assembly 30 that also shows light detectors 122 and 124. Light detector 122 is connected via fiber optic cable 126 to input fiber lines 32. Light detector 122 is also called light power sampler 122 or optical power detector 122. Optical detector 122 detects the power of the input light residing on respective input lines 132.

Optical power detector 124 is coupled to output fibers 34 via fiber lines 128. Optical output power detector 124 is also called light sampler 124 and light power detector 124. Detector 124 detects the optical power of light residing on respective output fiber optic lines 34.

For alternative embodiments of the present invention, detectors 122 and 124 can be of different designs. For example, detectors can be positioned to detect the light beams residing between input lens assembly 74 and output lens assembly 76. Thus, light detectors could be positioned to detect the optical power of light beams 110, 112, and 116 closer to the mirror assemblies 84 and 86.

In addition to showing a light path comprised of light beams 110, 112, and 116, FIG. 4 also shows a second light path comprised of light beams 130, 132, and 134.

Figure 5:
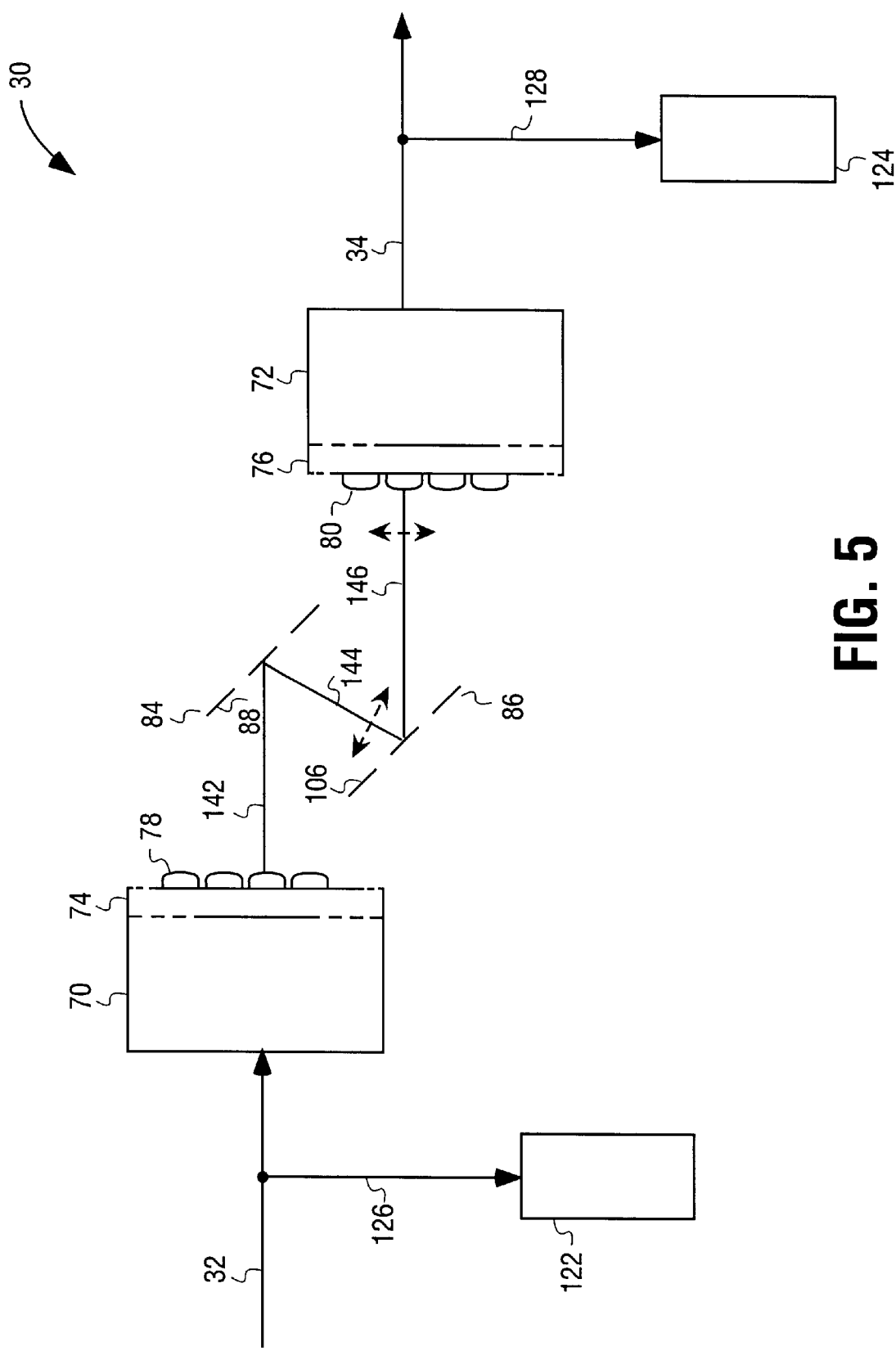
FIG. 5 is a top view of an optical path through the fiber and mirror assembly showing possible misalignment of the optical path.

FIG. 5 shows a top view of fiber and mirror assembly 30, but with light beams 142, 144, and 146 being the light path through fiber and mirror assembly 30.

In optical switch 12, misalignment can occur with respect to light beams, such as light beams 144 and 146. In optical switch 12, optical loss due to dynamic misalignment can occur in two places—namely, the pointing error of a gimbaled mirror in the first mirror array 84 and a pointing error of a mirror in the second mirror array 86.

An accurately pointed mirror from the first mirror plane 84 directs the light energy directly onto the second mirror on the path, which is one of the mirrors in second mirror array 86. Errors in pointing result in some light missing the mirror in the second mirror plane 86. In other words, as shown in FIG. 5, light beam 144 may be improperly pointed with respect to one of the mirrors 106 of second mirror array 86.

As discussed above, an optical switch loss might also be due to dynamic misalignment caused by a pointing error of a mirror in the second mirror array 86. The job of a mirror in second mirror plane 86 is to direct the light on to a lens of output lens array 80. Loss will increase as the body of the light beam moves off of the lens and more light is directed outside the aperture of the lens of output lens array 80. This error is illustrated in FIG. 5 as the possible offset of light beam 146 that runs from one of the mirrors 106 of second mirror plane 86 to one of the lenses within output lens array 80.

To summarize, optical power loss increases when a light beam, such as light beam 144, is offset from one of the mirrors 106 of second mirror plane 86. In addition, optical power loss increases when one of the beams, such as beam 146, is offset from one of the lenses of output lens array 80.

Because the light path within fiber and mirror array 30 is relatively large with respect to the apertures of the mirrors 88 and 86 and the apertures of the lenses, the two types of pointing error effects are largely independent. They are sufficiently independent to allow the optimization of the two mirror positions (i.e., first mirror plane and second mirror plane) separately.

A small change in position of one of the mirrors of either mirror array 84 or mirror array 86 from optimum would result in a small decrease in light output. Therefore, each mirror position can be characterized by a two dimensional curve that shows the decrease in optical power as the mirror moves away from the peak or optimal power.

Figure 6:
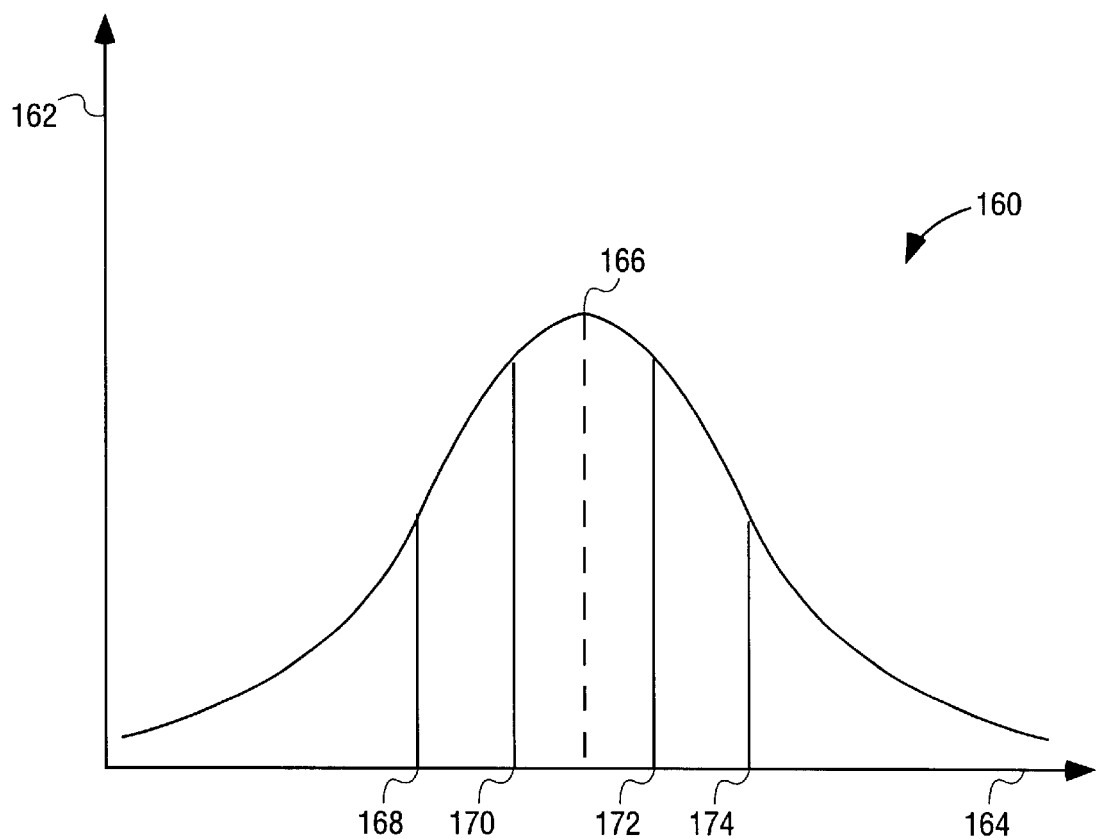
FIG. 6 is a substantially Gaussion curve of mirror position versus optical power.

FIG. 6 illustrates one possible optical power profile curve 160 that shows how optical power changes with the change in position of one of the mirrors of mirrors array 84 or 86. In FIG. 6, the curve 160 is approximately a Gaussian curve. In FIG. 6, optical power is plotted on the Y axis 162. Mirror angle or position is plotted on the X axis 164. Point 166 represents the peak or optimum optical power. At point 166, the gimbaled mirror is at the best or optimal position for transmitting the most light as in the best or optimum position for reflecting the most light. The curve 160 also shows the optical power for various other positions beside the peak, such as positions 168, 170, 172, and 174. Optical power is detected or measured for those various points 168, 170, 172, and 174. As seen by curve 160, the optical power falls off or lessens as the mirror moves away from the peak 166.

Figure 7:
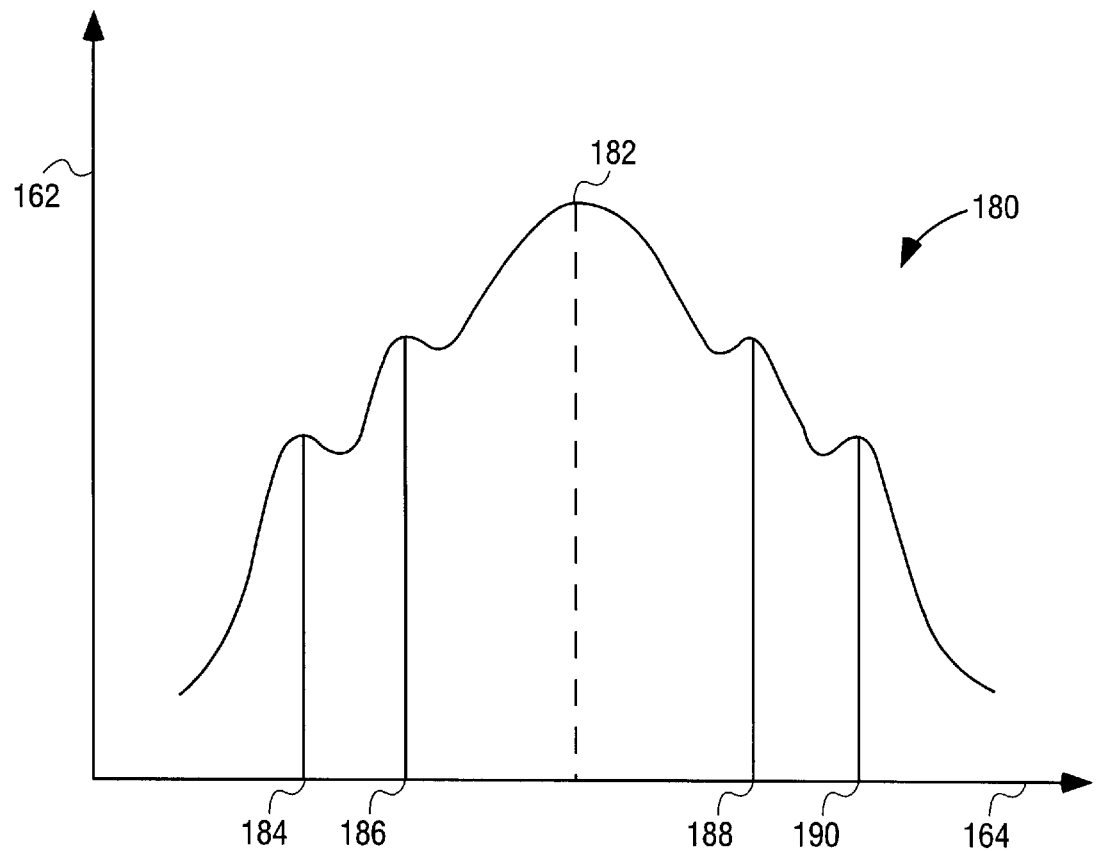
FIG. 7 is an example of a complex pattern of mirror position versus optical power.

Other types of optical power profiles are possible, however. For example, FIG. 7 shows a more complex pattern 180 that represents an optical power profile. In FIG. 7, optical power on axis 162 is plotted against gimbaled mirror angle or position plotted on X axis 164. Peak power is shown at point 182 in FIG. 7.

Complex pattern 180 exhibits false optical power maximums at mirror positions 184, 186, 188, and 190. A complex optical power profile such as profile 180 may be caused by refraction and reflection from the frames of a gimbaled mirror such as gimbaled mirror 90.

Figure 8:
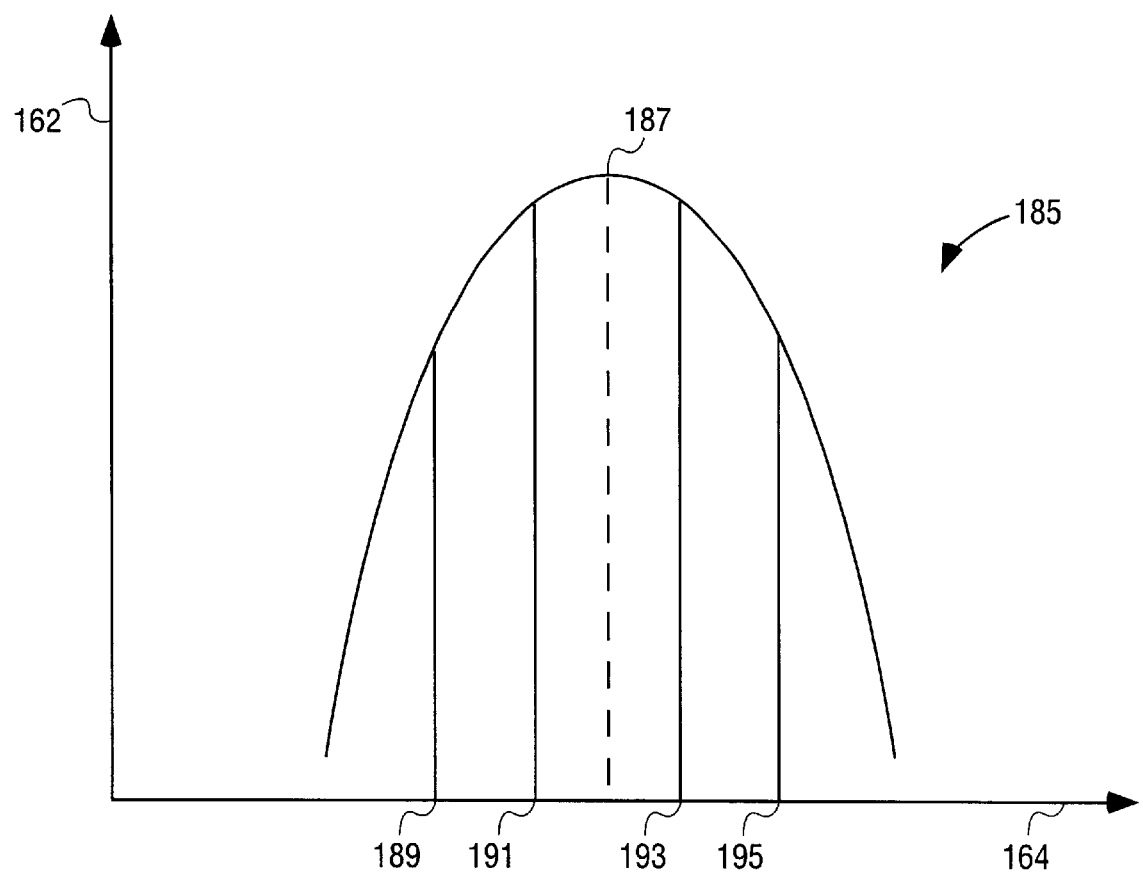
FIG. 8 is a substantially parabolic curve of mirror position versus optical power.

FIG. 8 shows another possible optical power profile 185. In FIG. 8, the curve 185 is substantially a parabola. Optical power is plotted on the Y axis 162. Mirror angle or position is plotted on the X axis 164. Point 187 represents the peak or optimum optical power. Curve 185 shows optical power for other positions, such as positions 189, 191, 193, and 195.

The forces needed to maintain the proper alignment for a mirror 92 in gimbaled mirror device 90 change with changes of temperature and over time. Moreover, the geometry of a complete mirror assembly, such as mirror assembly 84, may change over time and with changes in temperature. Other forces also may change alignment and geometry. For example, vibration, whether sudden or over time, may cause mirrors 88 and 106 to move out of alignment. A sudden jarring of an optical switch 12 may cause the mirrors to be pushed out of alignment. A reduction in optical strength of a light beam could ultimately result in the loss of data given that the light path through fiber and mirror assembly 30 could be so attenuated or distorted that insufficient light reaches one of the output lenses 80.

Optimization techniques described herein help to avoid or overcome misaligned mirrors and misaligned light paths. Those techniques involve generating a set of optical power values by measuring optical power related to optical reflections from the movable reflector of mirrors 88 and 106 for a plurality of positions of the movable reflectors.

Figure 9:
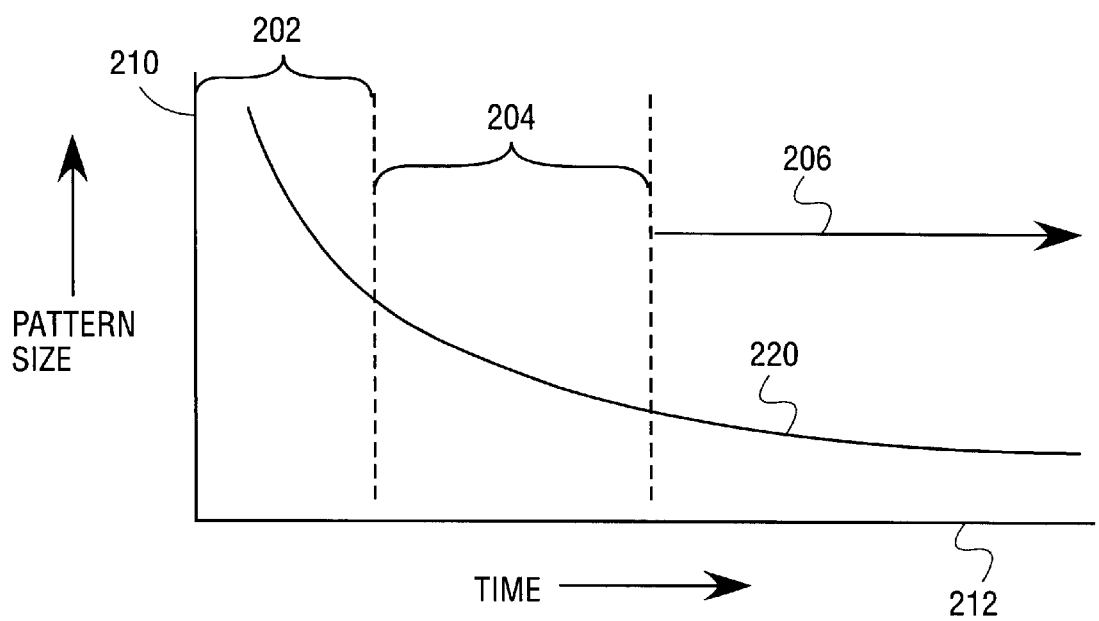
FIG. 9 is a graph of the size of mirror position patterns versus time for three positioning procedures for the mirror.

FIG. 9 is a graph of the mirror displacement pattern sizes versus time for three of the techniques used for optimizing the positions of the mirrors of the gimbaled mirrors 88 and 106 of fiber and mirror assembly 30. FIG. 9 is a plot of pattern size on axis 210 versus time on axis 212, resulting in a curve 220. Technique 202 is an initial search pattern technique that relies on relatively large changes in mirror position over time. Technique 204 is a hill climbing technique that uses single samples per mirror position, which relies on a smaller pattern size than the initial search pattern technique 202. Technique 206 is a hill climb technique that uses averages or integrals of multiple samples per position, and relies on very small changes of position of a mirror of the gimbaled mirrors 88 and 106. The three techniques 202, 204, and 206 are described in more detail below.

Figure 10:
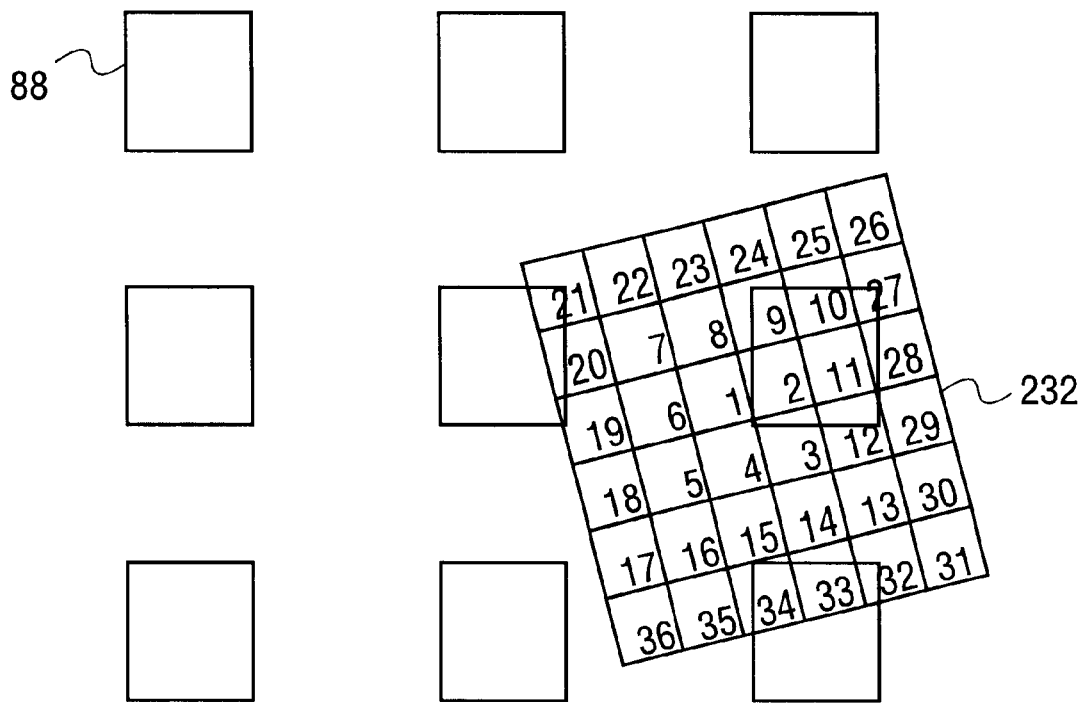
FIG. 10 shows a search pattern for a mirror positioning procedure.

FIG. 10 helps to illustrate the initial search pattern technique 202 for finding the optimal position of a mirror of mirror array 88 of first mirror plane 84. Initial search pattern technique 202 is also called the basic search 202 during initial path creation. If the initial alignment of the mirrors is very poor, then each mirror will execute a search pattern in the shape of the grid 232 of position. The pattern of squares on grid pattern 232 in FIG. 10 represents the positions of a reflected beam of light from one of the mirrors of mirror array 88. In other words, one of the mirrors 88 starts at point 1 on grid pattern 232 and the mirror position is moved in outward spiral following the numbers 2, 3, 4, etc., through the final position 36 of initial grid pattern 232.

This initial search technique uses large delta movements on the order of half a mirror width to make the optimization procedure as rapid as possible. Initial search pattern technique 202 uses a larger pattern size than techniques 204 and 206.

For each position in the grid pattern 232, the optical power is detected. Optical power readings are taken only once for each position of the mirror of mirrors 88. The power value used in the calculation is actually the optical output power as measured by optical output power detector 124 divided by the optical input power as measured by optical power detector 122. In other words, the optical power reading is actually power-out ("$P_{OUT}$") divided by power-in ("$P_{in}$"). The "power-out divided by the power-in" formula is used to compensate for slow variations in the optical input power and the effects from other mirror positioning activities upstream in the network.

The mirror position pattern 232 is shown in FIG. 10 as angled or offset with respect to mirror array 88 in order to show that the pattern 232 can lie in a different coordinate system than the mirror array 88. This is because the lens array 74, the first mirror plane 84, the second mirror plane 86, and the output lens array 76 may not be exactly in alignment and may be slightly offset from each other. This may require a mirror to be offset from an X or Y axis.

For the first mirror array 84, the DSP 38 provides the control signals to step the particular mirror of mirrors 88 through the position pattern 232. As noted above, the optical power value is measured at each point as the mirror is positioned at the different points of initial pattern 232. DSP 38 collects the optical power value versus position measurements and stores them. The DSP 38 then generates a mathematical approximation of the relationship of optical power versus mirror or reflector position based on the stored optical power values versus position information. For one embodiment of the invention, the mathematical approximation is a Gaussian curve, which is shown by the curve 160 in FIG. 6. For an alternative embodiment, of the invention, however, the mathematical approximation used is substantially a parabolic curve, which is shown by curve 185 of FIG. 8.

DSP 38 chooses a position of the movable mirror or reflector based on the peak or near peak point in the Gaussian curve of the relationship of optical power versus mirror position. That peak point is the optimal position of the mirror that provides the maximum optical power. The DSP 38 provides control signals to position the mirror of mirror array 88 in the optimal position, which is the peak 106 of the Gaussian curve 160. Thus, DSP 38 analyzes the Gaussian curve 160 to find the optimal position of the mirror in order to maintain the light path. The DSP 38 thus uses the feedback signal from the optical detector 124 (in conjunction with the input signal 122) in order to the move the mirror to maintain the optimal light path through optical cross connect switch 12.

This initial search pattern can be done using either working light or non-working light. Working light is light passing through optical switch 12 that carries digital information over a network, such as optical network 10. In other words, working light can be light that carries customer data, including digital data, voice data, and video data. Non-working light is light that does not carry customer data. An example of non-working light would be a test light used for aligning or testing the optical cross connect switch 12. A test light would be used for the initial search pattern technique when the optical switch 12 is first calibrated. Working light would be used during normal operation of the switch 12, however, given that there can be time delay in turning off working light (for example, 20 milliseconds).

Once the initial path creation technique 202 is done for one of the mirrors 88 in the first mirror array 84, the technique is then repeated for the mirror in the same light path in the second mirror array 86. Initial search pattern technique 202 starts with the mirror in the first mirror array 88 and moves to a mirror in the same light path but in the second mirror array 106. The processor 42 is used to switch from the first mirror array 84 to the second mirror array 86 during the initial pattern search 202 technique. The mirror of the mirror array 106 is thus positioned to walk through the grid pattern 232. Optical power readings are taken for each grid position by output optical detector 124 and input optical detector 122 to produce a $P_{OUT}$ divided by power-in $P_{in}$ reading of optical power value.

The DSP 40 controls the positioning of the mirror of mirror array 106 as the mirror position is changed to follow the grid pattern 232. The DSP 40 receives the optical power readings from optical power detectors 124 and 122. DSP 40 then generates a mathematical approximation of the relationship of optical power versus reflector position based on the set of optical power values received. For one embodiment of the invention, a substantially Gaussian relationship similar to that shown in FIG. 6 is used as the mathematical approximation by DSP 40. DSP 40 then chooses the peak point 166 in the Gaussian curve as the optimal point for the positioning of the mirror of mirror array 106. The mirror of mirror array 106 is then moved by the control signal from DSP 40 to the optimal position.

DSP 38 can apply the initial search pattern technique 202 in parallel as a multitasking operation on the various mirrors 88 of first mirror array 84. Similarly, DSP processor 40 can use the initial pattern search technique 202 in parallel as a multitasking operation with respect to the mirrors 106 of the second mirror array 86. Likewise, processor 42 can be operated in a multitasking mode to oversee the optimization procedure by moving from one mirror array 84 to another mirror array 86 for each of the mirrors in parallel.

Although the positions in the search pattern 232 are instigated by changes in the control voltage (or control current) going to the mirrors, they are scaled to be in the coordinate system of the target mirror plane, or in the deflection angle of the mirrors, depending on the circumstances.

Once the peak or optimum point 166 has been found using the initial path creation search technique 202, the further techniques 204 and 206 provide for smaller and smaller corrections to the position of the gimbaled mirror. For those techniques 204 and 206, the position deltas of the mirrors are slowly reduced to reduce the impact on the signal and to derive a better measurement of the peak or optimal value 166.

Once the initial path creation technique 202 is finished and light is detected through the light path 110, 112, and 116 through the fiber and mirror assembly 30, the hill climbing technique 204 is used to both find and maintain the optimal mirror position for maintaining the optimal light path. The hill climbing technique 204 works by making small changes to the mirror position, observing the optical power at these new points, and calculating the optimum mirror position.

The technique is called a "hill climbing" operation or technique because one is attempting to "climb" to the peak or optimum point 166 of the Gaussian curve 160 that shows the relationship between optical power and mirror position or angle.

The hill climbing technique is used first for one mirror of mirrors 88 of the first mirror array 84 and is then used on a mirror in the same light path that resides as part of mirror array 106 of the second mirror assembly 86. The optimization technique 204 is done for one mirror at a time, although the technique can be used in parallel for the mirrors within the same mirror plane.

Figure 11:
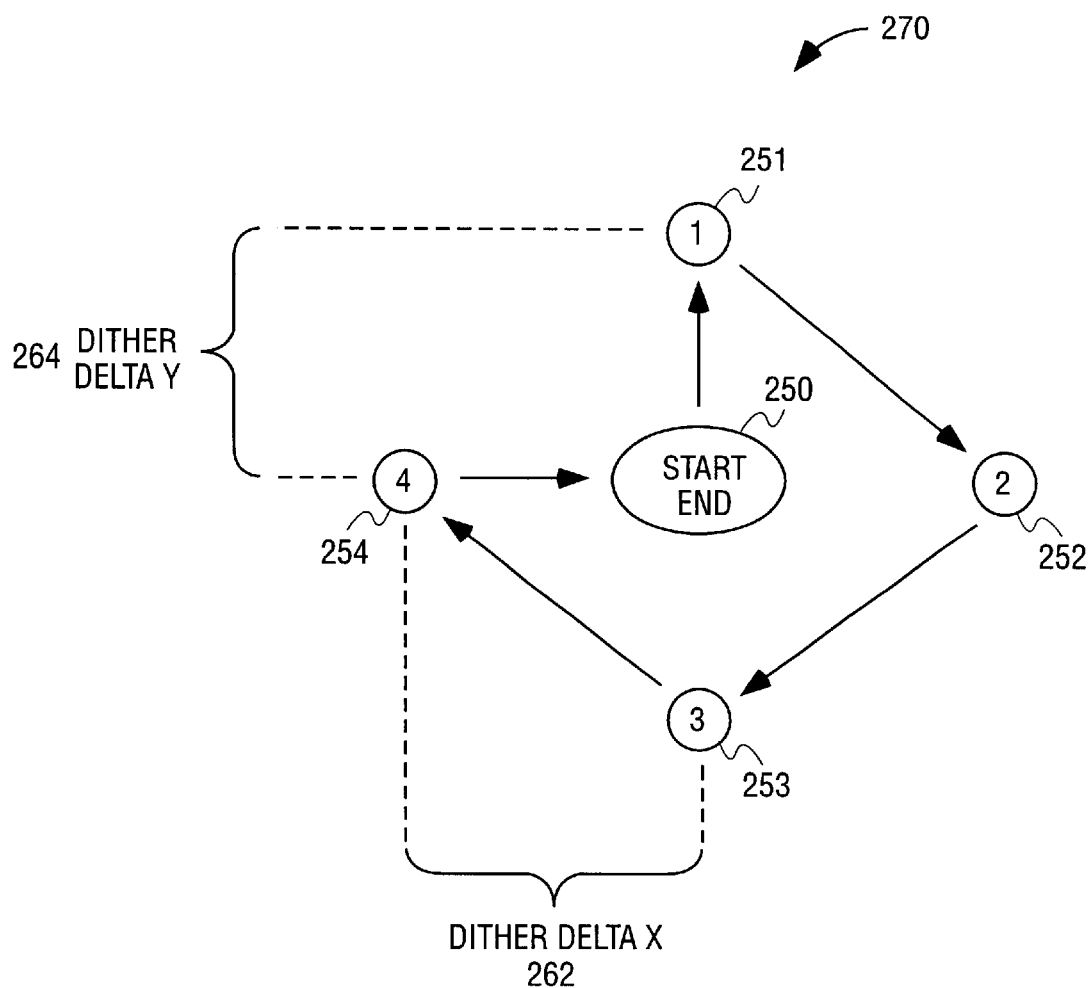
FIG. 11 shows a mirror dithering pattern for a positioning procedure for the mirror.

FIG. 11 shows the pattern 270 of positions 250 through 254 used to position the mirror for the hill climbing technique 204. Optical power readings are taken by optical power readings 124 and 122 with the mirror pointing sequentially to four position 251 through 254 surrounding the start position 250, and at the start 250 and end 250 of the pattern 270.

The mirror position starts at point 250. The mirror is dithered or moved in the delta Y distance 264 in order to reach position 251. The mirror is then dithered or moved a delta Y distance 264 and a delta X distance 262 in order to reach position 252. The mirror is then dithered or moved the delta X distance 262 and delta Y distance 264 to reach position 254. The mirror is then dithered or moved in a delta X distance 262 to reach end position 250. At each of the positions 251 through 254, and at the end position 250, the optical power readings are taken.

For a mirror of mirror array 88 of the first mirror plane 84, processor DSP 38 controls the movement of the mirror in order to step through position pattern 270. The DSP 38 also receives the optical power information for the various positions 250 through 254 from optical power detectors 122 and 124.

Power readings are taken once for each position. The power value used in the calculation is the optical power-out (as measured by optical power detector 124) divided by the optical power-in (as measured by optical power detector 122) in order to compensate for slow variations in input power and the effects of other hill climbing activities upstream. DSP processor 38 processes those optical power readings.

DSP 38 then generates a mathematical approximation of the relationship of the optical power readings versus the position of the mirror or reflector being moved based on the set of optical power values. For one embodiment of the invention, a substantially Gaussian curve similar to curve 160 shown in FIG. 6 is used for the mathematical approximation of the relationship of optical power versus reflector position. The DSP 38 then chooses the peak point 166 in the Gaussian curve as the optimal point for the mirror position. The peak point 166 is the optimal point in the relationship between optical power and reflector or mirror position. The DSP 38 then moves the gimbaled mirror to the peak position 166 or substantially the peak position 166 in order to achieve either the optimal power or substantially the optimum optical power.

Once the mirror of mirror array 84 is positioned to the optimal peak point 166, the processor 42 then switches to a mirror in the same optical path but within mirror array 106 of the second mirror point 86 in order to perform another hill climbing operation 204.

The second hill climbing operation for the second mirror residing within the second mirror plane 86 is controlled by DSP 40 of control circuitry 36. The DSP 40 controls the mirror to cause the mirror to step through pattern 270 shown in FIG. 10. The mirror of the second mirror array 86 starts at the start position 250 and steps through positions 251 through 254 and then is moved back to position 250. At each point of the positions 270 of FIG. 11 often dithering from the start position 250, the DSP 40 oversees the taking of optical power readings by optical power detector 124 and 122. The optical power value is used for those readings comprised of power-out as measured by optical detector 124 divided by the power in as measured by optical power detector 122. The DSP 40 generates a mathematical approximation of the relationship of optical power versus reflector position based on the set of optical power values. The mathematical approximation used is a Gaussian curve similar to curve 160 shown in FIG. 6. The DSP chooses a peak position 166 as the optimal position of the mirror of mirror array 86. The DSP 40 then moves the mirror of mirror array 86 to the optimal or peak position 166 in order to optimize the light path through the fiber and mirror assembly 30.

For alternative embodiments of the invention, another pattern besides the Gaussian pattern may be used as the mathematical approximation. For example, the mathematical approximation can be substantially a parabolic curve 185, as shown in FIG. 8.

For one embodiment of the invention, working light is used during the hill climb technique 204 in order to optimize the path. For other embodiments however, non-working light can also be used for the hill climbing technique 204. The advantage of using working light, however, is that the optical cross connect switch 12 can continue to transmit data and not be off line during the hill climbing 204.

As can be seen in FIG. 9, the size of the pattern 270 of changes in position of the mirror is smaller for the hill climbing technique 204 than the initial pattern search technique 202. In other words, the dither pattern 270 of hill climbing technique 204 is smaller than the grid pattern 232 of the initial path creation technique 202 because the mirror displacements are smaller.

As shown in FIG. 9, the next optimization technique used is technique 206, which is the hill climbing technique that uses an average (i.e., mean) or integration of multiple optical power samples. As shown in FIG. 9, the pattern size used for the hill climbing technique 206 is even smaller than the pattern size used by the single value hill climbing technique 204. As the delta mirror displacements or pattern sizes are reduced, the changes in the measured optical power signal becomes smaller until signal noise becomes a significant factor. To overcome this problem, the hill climbing technique 206 that uses averages takes a large number of optical power samples at each dithered position rather than a single measurement of optical power at each point in a grid or pattern. This multiple sampling technique allows for very precise measurements of gain to be made, enabling very small dithers or changes in position. This results in changes in optical system 12 loss that are well below the noise level of the working or non-working light.

Figure 12:
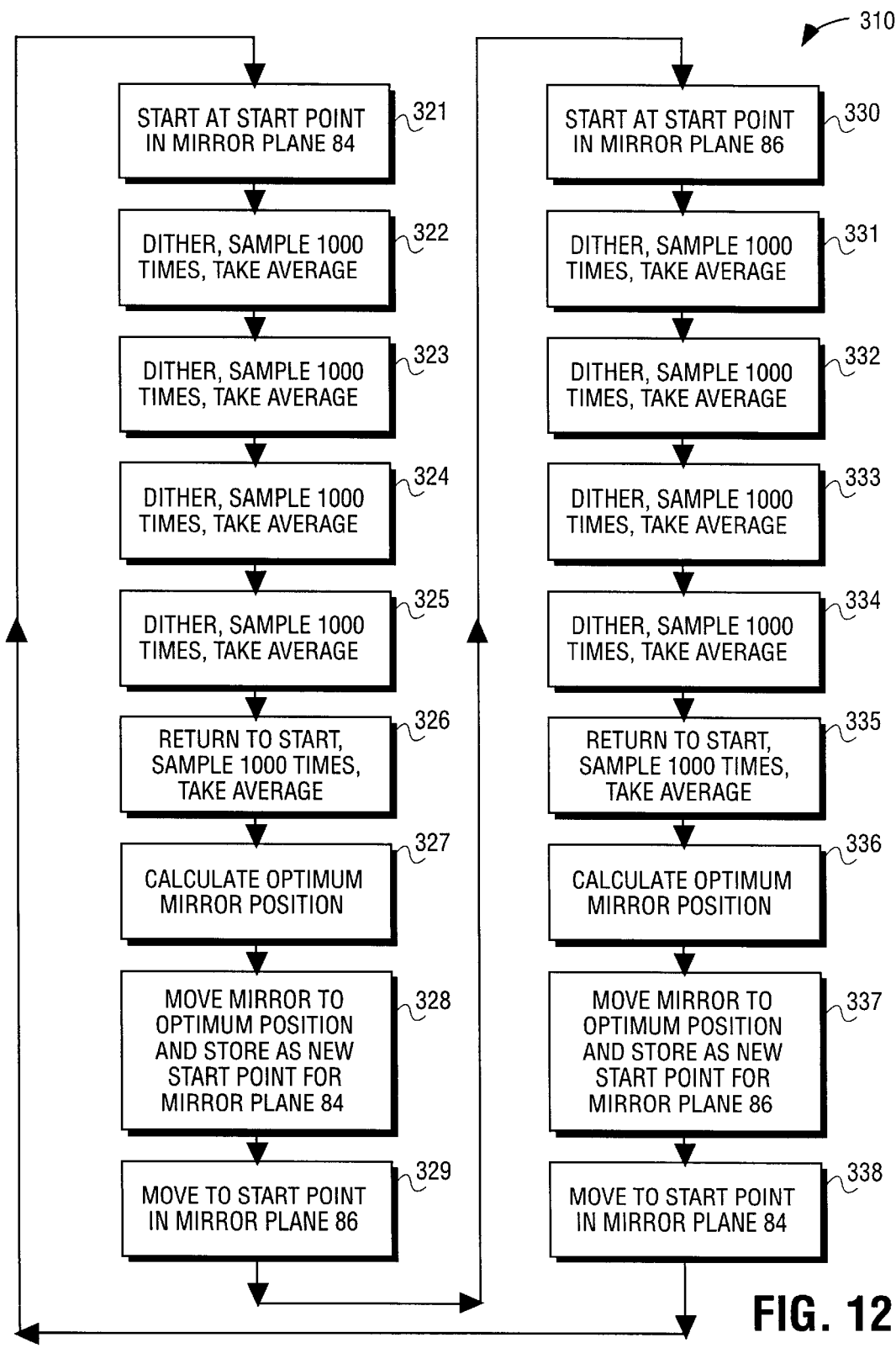
FIG. 12 is a flow chart of a mirror positioning procedure that uses the averaging of samples.

FIG. 12 shows the steps 310 that are used to implement the method of the hill climbing technique 206 that uses the average of multiple samples. The hill climbing technique 206 that uses multiple samples uses a similar grid pattern to grid pattern 270 except that the dithered delta X and delta Y distances are smaller. But the hill climbing technique 206 uses the similar type of spiral-type pattern.

For the hill climbing technique 206, at step 321 the procedure starts at a start point in mirror plane 84 for one of the gimbaled mirrors 88 of gimbal mirror plane 84. DSP 38 controls the movement of the mirror and the power measurements during the process flow 310 shown in FIG. 12.

At step 322, DSP 38 causes the mirrors to dither in a delta Y direction. At that new point, the DSP samples the optical power values for one thousand times at that same point. The DSP 38 uses optical power detector 124 and optical power detectors 124 and 122 to measure the optical power. The power value measurement used is the power output from detector 124 divided by the power input from optical detector 122. DSP processor 38 then integrates or averages all the one thousand optical power samples to calculate an average power sample at that point.

At step 323, DSP 38 causes the gimbaled mirrors to dither in both a delta X and a delta Y direction to a new point. The DSP 38 then samples the optical power for that point by using optical power detectors 124 and 122 to calculate the power-out divided by the power-in for each of the one thousand samples. The DSP 38 then integrates or averages those power samples to calculate an average power value for that point.

At step 324, the DSP 38 causes the mirror to dither in a delta X and delta Y direction to a new point. The DSP 38 then takes uses the optical power detectors 124 and 122 to take one thousand power samples of the optical power-out divided by the optical power-in. The DSP 38 then integrates or averages those sampled optical powers to come up with an average power value for that new point.

At step 325, the DSP 38 causes the mirror to dither in a delta X and delta Y direction to a new point. The DSP 38 then samples the optical power one thousand times, each time using the optical power detectors 122 and 124 to determine the optical power-out divided by the optical power-in. The DSP 38 then integrates or averages those power readings to come up with an average optical power reading for that point or position.

At step 326, the DSP 38 causes the mirror to return to the start position. The DSP then takes one thousand samples of optical power using the optical power detectors 124 and 122 to determine the power-out divided by the power-in for each of those samples. The DSP 38 then integrates or averages those power samples to determine an average power value for that mirror position.

At step 327, the DSP 38 calculates an optimum mirror position by generating a mathematical approximation of the relationship of the optical power versus mirror or reflector position based on the set of optical power values. In other words, the DSP 38 plots the average optical power values for each of the points generated for the pattern used for steps 322 through 326. For one embodiment of the invention, the mathematical approximation used is substantially a Gaussian curve similar to curve 160 shown in FIG. 6. The DSP 38 then chooses the peak or optimum point 166 in the Gaussian curve as the optimal position of the mirror. Alternatively, parabolic curve 185 of FIG. 8 could be used for the mathematical approximation.

At step 328, the DSP 38 sends control signals to the mirror to move the mirror to the optimum position 166. The DSP 38 also stores that new position 166 as the new start point for the mirror within mirror plane 84.

At step 329, the DSP 40 moves the process to a start point in a mirror in the same light path but within the second mirror plane 86. At step 330, the DSP 40 starts at the start point mirror position for the mirror in second mirror plane 86.

At step 331, the DSP 40 dithers or moves the mirror in the delta Y direction to a new point. The DSP 40 then samples optical power one thousand times for that point. The sampling is done using optical power detectors 124 and 122 to calculate the power-out divided by the power-in for each of the one thousand samples. The DSP 40 then integrates or averages the one thousand optical power samples to calculate and average optical power readings for that dithered position.

At step 332, the DSP 40 dithers or moves the mirror in both the delta X and delta Y distance to a new point. DSP 40 then takes one thousand optical power samples using the optical power detectors 124 and 122 to get a power-out divided by a power-in reading for each of the one thousand samples. The DSP 40 then integrates or averages those power samples to calculate an average power for the point to the mirror position.

At step 333, the DSP 40 then dithers the mirror in delta X and delta Y distances to a new point. The DSP 40 takes one thousand power samples of power-out divided by power-in using the power optical detectors 124 and 122. DSP 40 then integrates or averages those power samples to calculate an average power reading associated with that mirror position.

At step 334, DSP 40 then dithers the mirror in a delta X and a delta Y direction to a new point. DSP 40 takes one thousand power samples of optical power-out divided by optical power-in. DSP 40 then integrates or averages those optical power samples from the optical power detectors 124 and 122 and calculates and average optical power value for that mirror position.

At step 335, DSP 40 moves the mirror to the start point for that mirror in mirror plane 86. DSP 40 then samples the optical power-out divided by the optical power-in as measured by optical power detectors 124 and 122. DSP 40 then averages one thousand optical power samples to calculate an average power sample for that position of the mirror.

At step 336, DSP 40 then calculates the optimum mirror position. DSP 40 does this by generating a mathematical approximation of the relationship of optical power versus reflector position based on the set of optical power values for the various mirror positions determined at steps 331 through 335. For one embodiment of the invention, a Gaussian curve similar to curve 160 is chosen as the mathematical approximation. The DSP 40 chooses the peak or optimum point 166 as the optimal mirror position. Alternatively, parabolic curve 185 of FIG. 8 could be used as the mathematical approximation.

At step 337, DSP 40 moves the mirror to the optimal position 166 or substantially the optimal position 166 and stores that optimum position as a new start point for that mirror within mirror plane 86.

At step 338, processor 42 then causes the process to move to the recalculated start point of the mirror in the mirror path within mirror plane 84. In other words, processor 42 returns to step 321, although the start point is now the start point previously calculated at step 328.

As shown in FIG. 9, the process steps 310 of the hill climbing procedure 206 continue indefinitely as long as the optical cross-connect switch continues to operate. As can be seen in FIG. 8, the pattern size for the hill climbing averaging technique 206 is even smaller than the patterns used for techniques 204 and 202 because smaller mirror displacements are used.

Although FIG. 12 shows method steps 310 that employ sampling one thousand times, other numbers of sampling could be taken, for example 500 times, 10 times, 5000 times, etc.

The result of operating the hill climbing technique 206 continuously, as shown from steps 310 of FIG. 11, is that the mirrors are maintained in the optimal or near optimal position despite the effects of temperature, time, and drift. The process of technique 206 can be performed during normal use of optical switch 12. Indeed, techniques 202 and 204 may also be performed during normal switch operation.

If the mirror light path becomes disturbed for any reason and light is significantly diminished, the pattern size used in the hill climbing technique is increased by control circuitry 36. In other words, the hill climbing delta position distance is increased if there is a disturbance that reduces light significantly.

Control circuitry 36 of the optical switch 12 can also do a diagnostic procedure regarding beam shape to ensure the correct light source. Control circuitry 36 can cause the DSPs 38 and 40 and processor 42 to check optical power at various positions to make sure that a Gaussian style curve, such as curve 160, is present. If there is not a Gaussian style curve present, control circuitry 36 can indicate an error in positioning and run a diagnostic procedure to see what is wrong. For one embodiment, the diagnostic procedure can involve returning to the initial path creation technique 202 in order to realign the mirrors.

Another diagnostic procedure that can be run by control circuitry 36 is to confirm that repositioning the mirrors does have an impact on the optical power output. For example, if changing the position of the mirrors does not change the optical power, the control circuitry 36 can indicate an error and run a diagnostic procedure. The diagnostic procedure may be for example to return to the initial search pattern path establishment technique 202.

For an embodiment of the present invention, the control circuitry 36, using processor 42, can analyze the corrections made to the various mirrors of mirror arrays 84 and 86. That analysis can then be used to look for patterns of positioning and to also predict drift for various mirrors.

For one embodiment, all mirrors of mirror arrays 84 and 86 are kept in paths in order to maintain their integrity.

For alternative embodiments, the techniques described herein can be used for other optical devices besides optical switches, such as optical patch panels and other optical devices employing mirrors or reflectors.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for positioning a movable reflector in an optical switch, comprising:
   (a) taking a plurality of optical power samples associated with optical reflections from the movable reflector for a position of the movable reflector;
   (b) using a processor to average the plurality of optical power samples to produce an average optical power value for the position of the movable reflector;
   (c) repeating the above steps (a) and (b) for each of a plurality of positions of the movable reflector to produce a set of average optical power values associated with a plurality of positions of the movable reflector;
   (d) using the processor to generate a mathematical approximation of a relationship of optical power versus reflector position based on the set of average optical power values;
   (e) choosing a position of the movable reflector based on a point in the mathematical approximation of the relationship of optical power versus reflector position.

2. The method of claim 1, wherein the mathematical approximation is substantially a Gaussian curve.

3. The method of claim 1, wherein the mathematical approximation is substantially a parabolic curve.

4. The method of claim 2, wherein the point in the mathematical approximation that is used to choose the mirror position is substantially the peak point in the Gaussian curve.

5. The method of claim 1, wherein the movable reflector is a gimbaled mirror in a microelectromechanical system (MEMS) device.

6. The method of claim 1, wherein the optical reflections from the movable reflector comprise coherent light carrying data.

7. The method of claim 1, wherein procedures (a) through (e) are repeated during normal operation of the optical switch.

8. A method for positioning a movable reflector in an optical switch, comprising:
   (a) performing a first positioning procedure for the movable reflector, comprising:
      (i) generating a first set of optical power values by measuring optical power related to optical reflections from the movable reflector for a first pattern of positions of the movable reflector;
      (ii) using a processor to generate a first mathematical approximation of a first relationship of optical power versus reflector position based on the first set of optical power values;
      (iii) choosing a first position of the movable reflector based on a first point in the first mathematical approximation;
   (b) performing a second positioning procedure for the movable reflector, comprising:
      (i) generating a second set of optical power values by measuring optical power related to optical reflections from the movable reflector for a second pattern of positions of the movable reflector, wherein the second pattern has smaller mirror displacements than the first pattern;
      (ii) using the processor to generate a second mathematical approximation of a second relationship of optical power versus reflector position based on the second set of optical power values;
      (iii) choosing a second position of the movable reflector based on a second point in the second mathematical approximation;
   (c) performing a third positioning procedure for the movable reflector, comprising:
      (i) taking a plurality of optical power samples associated with optical reflections from the movable reflector for a position of the movable reflector;
      (ii) using the processor to average the plurality of optical power samples to produce a mean optical power value for the position of the movable reflector;
      (iii) repeating the above procedures (c) (i) and (c) (ii) for each of a rest of positions of a third pattern of positions of the movable reflector to produce a third set of optical power values, wherein the third pattern has smaller mirrored displacements than the second pattern;
      (iv) using the processor to generate a third mathematical approximation of the third relationship of optical power versus reflector position based on the third set of optical power values;
      (v) choosing a third position of the movable reflector based on a third point in the third mathematical approximation.

9. The method of claim 8, wherein the third positioning procedure uses the second position of the movable reflector as a starting point.

10. The method of claim 8, wherein the first, second, and third mathematical approximations are each a substantially Gaussian curve.

11. The method of claim 8, wherein the movable reflector is a gimbaled mirror of a microelectromechanial system (MEMS) device.

* * * * *